United States Patent [19]

Kondo et al.

[11] Patent Number: 4,900,625
[45] Date of Patent: Feb. 13, 1990

[54] DEEP-COLORED FIBERS AND A PROCESS FOR MANUFACTURING THE SAME

[75] Inventors: Yoshikazu Kondo; Toshihiro Yamamoto, both of Hofu; Shunya Ida, Nara; Atsushi Yamamoto, Hikone, all of Japan

[73] Assignee: Kanebo, Ltd., Tokyo, Japan

[21] Appl. No.: 160,584

[22] Filed: Feb. 26, 1988

[30] Foreign Application Priority Data

Mar. 3, 1987 [JP] Japan .................................. 62-49534
Apr. 13, 1987 [JP] Japan .................................. 62-90485
Apr. 18, 1987 [JP] Japan .................................. 62-95766
Oct. 19, 1987 [JP] Japan .................................. 62-263262

[51] Int. Cl.$^4$ ............................................. B32B 27/00
[52] U.S. Cl. ..................................... 428/383; 428/375; 428/380; 428/391
[58] Field of Search ................. 428/375, 383, 380, 391

[56] References Cited

U.S. PATENT DOCUMENTS

| 4,400,424 | 8/1983 | Hatada et al. | 428/212 |
| 4,451,534 | 5/1984 | Akagi et al. | 428/372 |
| 4,522,873 | 6/1985 | Akagi et al. | 428/283 |
| 4,619,667 | 10/1986 | Ueno et al. | 8/444 |

FOREIGN PATENT DOCUMENTS

| 52-099400 | 8/1977 | Japan . |
| 53-111192 | 9/1978 | Japan . |
| 55-107512 | 8/1980 | Japan . |
| 59-015568 | 1/1984 | Japan . |
| 59-076983 | 5/1984 | Japan . |
| 59-213736 | 12/1984 | Japan . |
| 60-017190 | 1/1985 | Japan . |
| 60-075668 | 4/1985 | Japan . |
| 60-162864 | 8/1985 | Japan . |
| 60-224878 | 11/1985 | Japan . |
| 61-063791 | 4/1986 | Japan . |
| 61-083375 | 4/1986 | Japan . |
| 61-097467 | 5/1986 | Japan . |
| 61-097490 | 5/1986 | Japan . |
| 1199385 | 7/1970 | United Kingdom . |

Primary Examiner—James J. Bell
Attorney, Agent, or Firm—Flynn, Thiel, Boutell & Tanis

[57] ABSTRACT

Deep-colored fibrous articles, such as fabrics colored in a deep black shade, having on it surfaces a film coating of a resin mixture comprising at least two resins that are mutually miscible but incompatible and in phase-separated conditions. Color-deepening effect is augmented by forming pits and/or recesses and projections on the surfaces of the film coating by using resins different in solvent-solubility and eluting the resin having a larger solubility with a solvent. The above effect is further augmented by using resins different in plasma etching resistance and subjecting the formed film coating to a low-temperature plasma etching treatment. The plasma etching is effectively conducted by placing the fibrous article within a plasma sheath, preferably contacting with an antenna electrode. The deep color can be made abrasion resistant by further depositing an abrasion resistant resinous film on the pit-formed resinous film coating without filling up the pits.

31 Claims, 8 Drawing Sheets

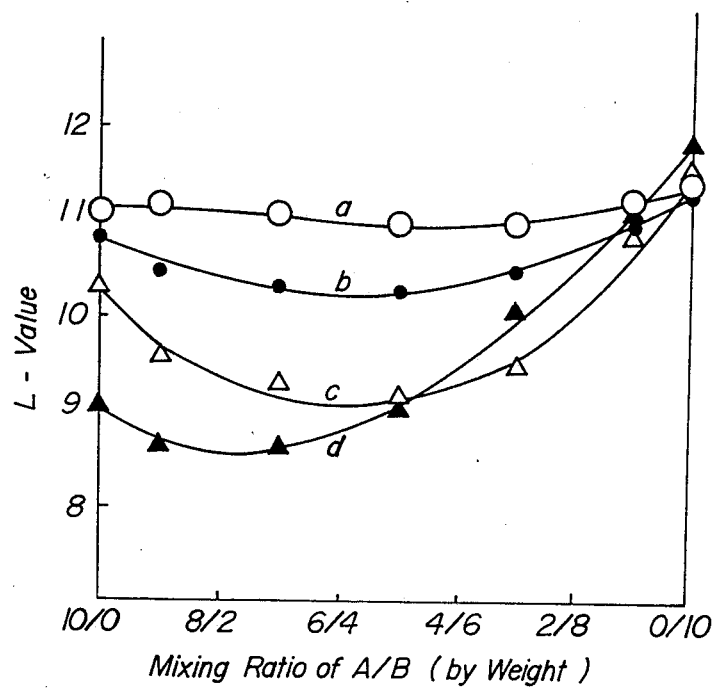
FIG_1

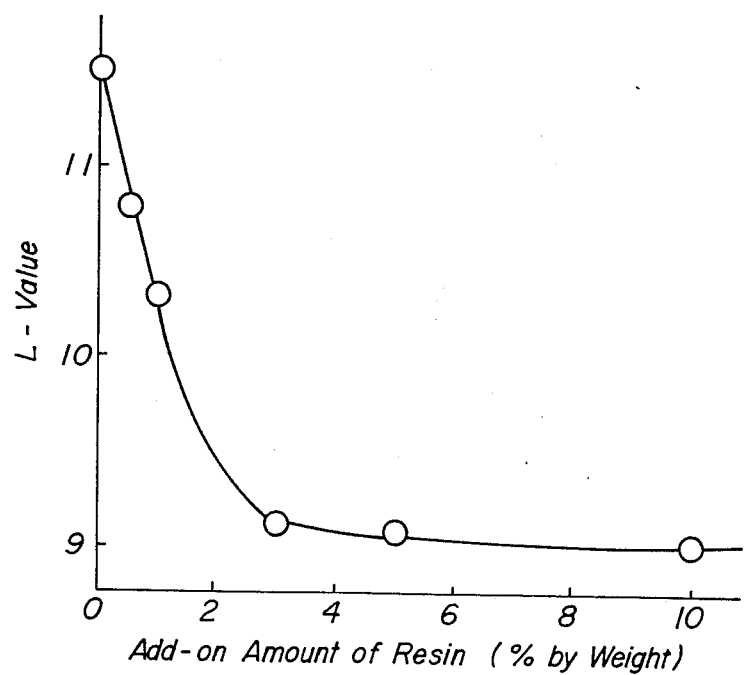
FIG_2

FIG_3
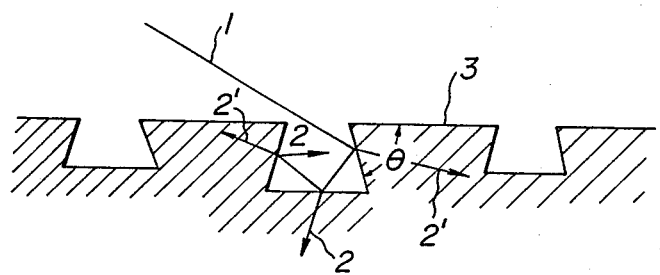
FIG_4
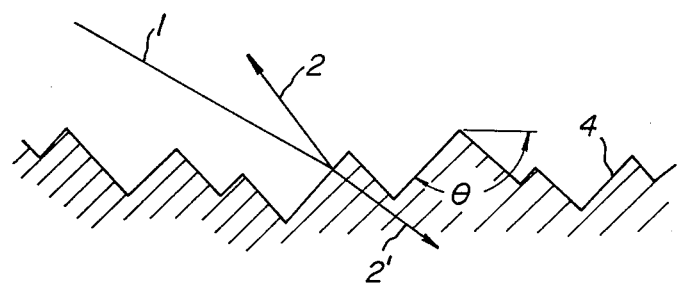

FIG_5A
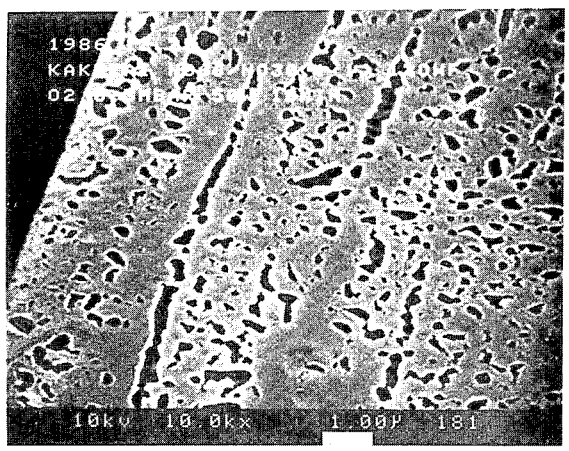
FIG_5B
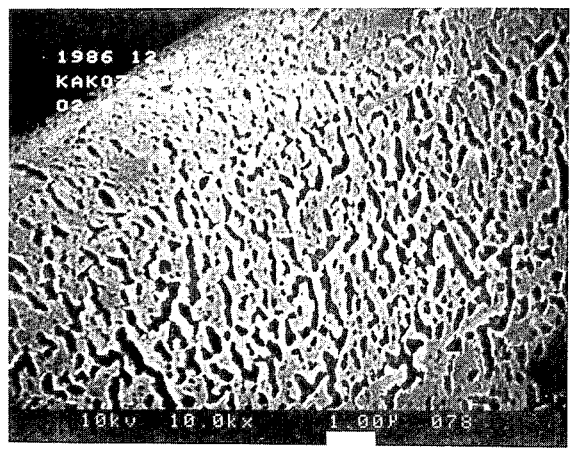

FIG_5C
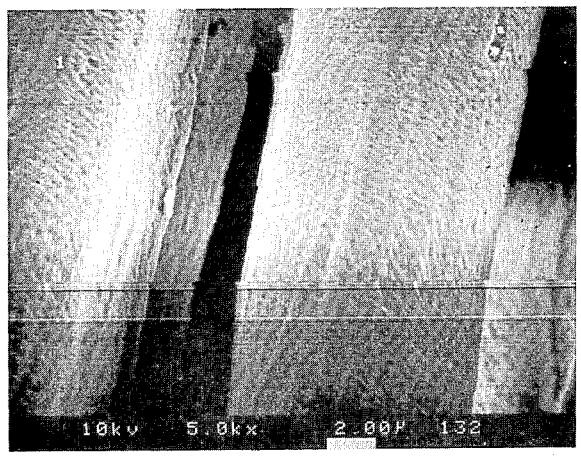
FIG_5D
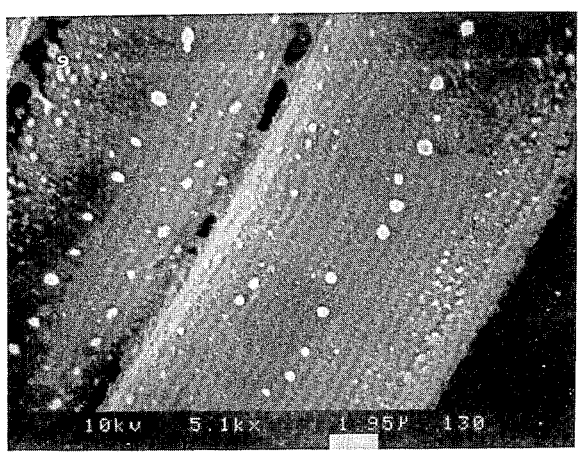

FIG_6A
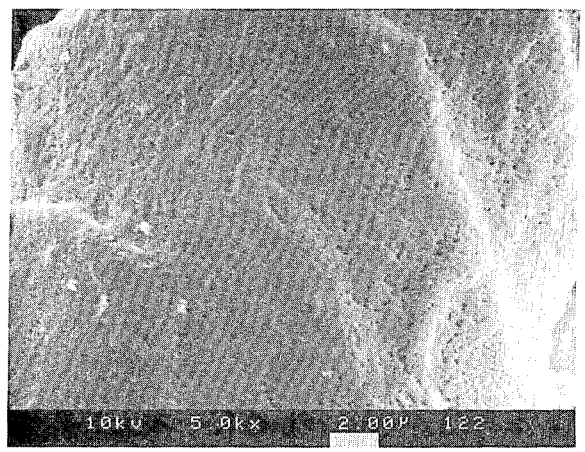
FIG_6B
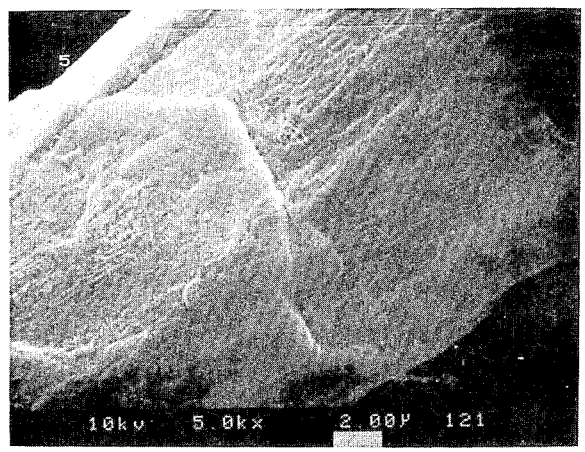

FIG_7
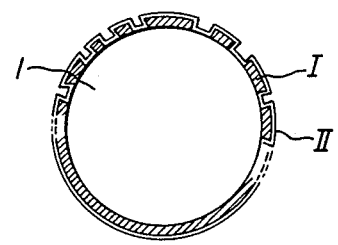
FIG_8
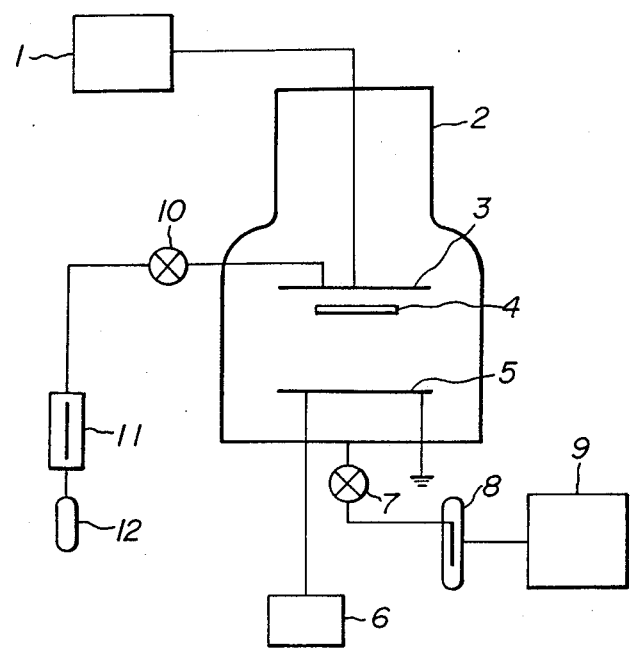

FIG_9
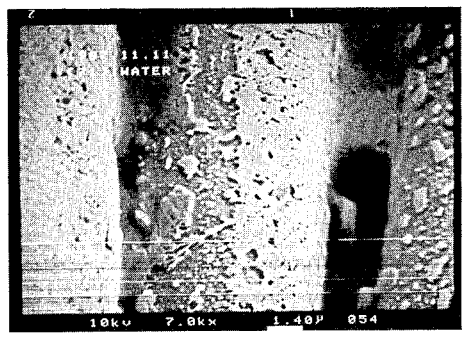
FIG_10
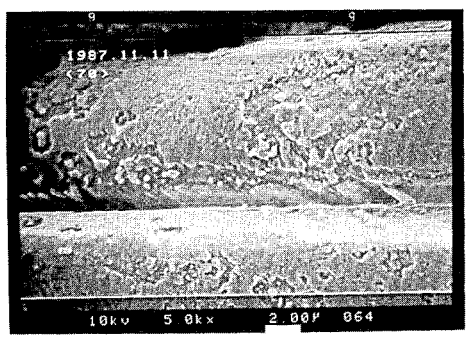

DEEP-COLORED FIBERS AND A PROCESS FOR MANUFACTURING THE SAME

BACKGROUND OF THE INVENTION

1. Field of the Invention

The present invention relates to deep-colored fibers, particularly, those having an excellent deepcolor durability and a process for manufacturing the same.

2. Description of the Prior Art

The study for providing synthetic fibers and natural fibers with a vivid and deep color has hitherto been extensively carried out and improvements aiming at the so-called "raven black", for example, have been proposed.

In Journal of the Textile Machinery Society of Japan, Vol. 22, (No. 5) pp. 360–368 (May, 1969) and British Pat. No. 1,199,385, there are seen early disclosures of an optical color improvement performable by roughening fiber surfaces to an adequate ruggedness. Further, Japanese Patent Application Laid-open No. 52-99,400 proposed deep-colored fibers having fine recesses and projections of specified shapes on the surfaces thereof. However, in the processes to produce such fibers, the fibers' own surfaces are etched so that difficulties have been encountered such as a low etching rate, color fading due to abrasion of too fine and numerous recesses and projections, decomposition of dyes, lowering of color fastness, hard control of etching conditions, or the like. In addition, many problems have been posed in the practical use, such as poor development of the color-deepening effect, or the like, attributable to a refractive index of a surface layer of the fiber that is same as that of the material of the fiber or increased as the density increases. Alternatively, color-deepening finishing processes have so far been carried out by treating with various finishing agents to form low refractive surface layers, such as fluoro-chemical finishes, silicone finishes, polyurethane finishes, or the like. Though these processes are simple, convenient and industrially feasible without requiring any special equipments, yet difficulties in uniform application to the fiber surfaces of the finishing agents, deterioration of the hand and color shade, lowering of color-fastness, etc. are unavoidable. Moreover, with respect to color-deepening performances, there are questions of deficiency as only the prevention of reflection is effected by low refractive indices of the finishing agents.

Japanese Patent Application Laid-open No. 55-107,512 is directed to a process wherein polyester itself is admixed with alkali-soluble fine particles, e.g., fine grain silica, and after spinning into fibers, recesses are formed on the fiber surfaces by eluting these particles with an alkaline solution. According to this process, since the particles are so fine and uniformly dispersed that the elution progresses simultaneously at extremely numerous and very closely adjacent portions, a great number of fine recesses and projections are formed. However, this process cannot form well-defined recesses or projections having acute-angled edges. Therefore, the color-deepening effect has not been satisfactory.

U.S. Pat. No. 4,400,424 has proposed good durable deep-colored fibers having smooth surfaces that are produced by filling up recesses on the surfaces of the fibers with a resin having a low refractive index. However, according to this process, it is difficult to form specified recesses on the surfaces of the fibers, particularly, natural fibers. Even if the recesses could be formed, the development of deep color would be poor since the fiber surfaces had been smoothed by filling up the recesses with the resin. Namely, in this reference, a study was conducted in a region where an L-value of fabrics before a rubbing test was between 11 and 13 that could not be said to be "raven black". Further, the recesses and projections are formed on the fiber itself through a plasma etching treatment, which are caused by a higher order structure such as crystals in the fiber, size and arrangement of amorphous regions and the like. Therefore, only recesses and projections very small in size and uniform in shape and arrangement are provided as disclosed by the above reference or Japanese Patent Application Publication No. 11,709/1984. From the above reasons, the color-deepening performances are not sufficient. As for fastness to crocking, what is liable to abrasion is the resin that is adhered on the fiber rather than the fiber itself that has been drawn to orient and crystallize its molecules considerably. Therefore, it is necessary to employ selectively an abrasion resistant resin that is excellent in mechanical properties and affinity for the fiber.

In Japanese Patent Application Laid-open No. 61-97,490, 60-224,878 or others, there have been proposed processes for providing polyester fibers with a deep color by applying a silicone resin to the polyester fibers followed by a plasma treatment. According to these processes, etching conditions are no good such that the etching rate of the silicone resin finishing agent covering the fibers is too low to form well-defined recesses and projections. Accordingly, these processes cannot provide industrially advantageously fibers with an improved color-deepening property or durable deep color. Additionally, another problem is that a great number of recesses and projections having a simple and uniform shape are formed, so that these fine and simply shaped recesses and projections would be readily fractured due to friction during washing or a normal use, causing partial impairment of the color-deepening property, resulting in deterioration of the quality such as uneven color, undesirable glaze of fabrics, or the like.

Japanese Patent Application Laid-open No. 60-17,190 has proposed a process wherein a resinous film having differentiated resistances for plasma etching is formed on fiber surfaces and many fine recesses and projections are formed on the surface of the resinous film by a plasma treatment. Preferable films comprise inorganic fine particles and a resin that is excellent in compatibility therewith and in uniform covering property, or a cationic polyurethane and/or a vinylpolymer-modified cationic polyurethane having a refractive index of not exceeding 1.5. In the above proposal, the recesses and projections formed on the surfaces of the resinous film are small in size and large in number so that problems similar to the aforementioned still exist.

U.S. Pat. No. 4,522,873 has proposed a process for producing deep-colored fibers wherein fibers are subjected to a film-forming treatment with an agent comprising a silicone resin and inorganic fine particles admixed therewith, followed by a plasma treatment. This proposed process is also involved in problems such as a low etching rate, uneven etching caused by uneven distribution of the fine particles adhered on the fiber surfaces, change in performance caused by falling-off of the fine particles, or the like.

As mentioned above, the conventional color-deepened fibers have had drawbacks such as an insufficient depth of color, insufficient durability, low rate of color-deepening treatment, or the like.

SUMMARY OF THE INVENTION

An object of the present invention is to provide industrially advantageously fibers having an excellent durability and a deep color level that heretofore has not been attainable.

Another object of the present invention is to provide processes for manufacturing such fibers.

The deep colored fibers of the first embodiment according to the present invention have a film coating of a resin mixture comprising at least two kinds of resins that are incompatible with each other and in phase-separated conditions in the film coating.

In the fibers of the present invention, said at least two resins are preferred to be different in affinity for the fibers.

Further, the refractive index $n_A$ of the resin phase that is lower in affinity for the fiber, the refractive index $n_s$ of the resin phase that is higher in affinity for the fiber and the refractive index $n_O$ of the fiber are in an interrelation satisfying the following inequalities:

$n_A < n_B$ and $n_A < n_O$.

In another preferable embodiment, i.e., the second embodiment, of the present invention, said at least two resins which are incompatible with each other are different in solvent-solubility and on at least a part of the surfaces of the film coating, pits and/or recesses and projections are formed by elution of at least one resin.

In a further preferable embodiment, i.e., the third embodiment, of the present invention, said at least two resins which are incompatible with each other are different in plasma etching resistance and on at least a part of the surfaces of the film coating, pits and/or recesses and projections are formed by plasma etching of at least one resin.

In a more preferable embodiment, i.e, the fourth embodiment, of the present invention, the surfaces of the film coating having said pits and/or recesses and projections are further covered by an abrasion resistant resinous film to improve color fastness to rubbing or abrasion resistance.

BRIEF DESCRIPTION OF THE DRAWING

The above and other objects, features and advantages of the present invention will become more apparent from reading the following description of the preferred embodiments taken in connection with the accompanying drawings, wherein:

FIGS. 1 and 2 are graphs showing the relations of L-value with mixing ratio of two resins in the film coating and with add on amount of the film coating respectively, in an embodiment of the present invention;

FIG. 3 is a schematical cross-sectional view of the deep-colored fiber of the present invention;

FIG. 4 is also a schematical cross-sectional view of a conventional deep-colored fiber;

FIGS. 5A and 5B are SEM photomicrographs (10,000 magnifications) of the surface of deep-colored polyester fibers in preferable embodiments of the invention, respectively;

FIGS. 5C and 5D are also SEM photomicrographs of the surface of polyester fibers in Comparative Examples, respectively;

FIG. 6A is a SEM photomicrograph of a surface of a deep-colored woolen fiber in preferable embodiment of the invention;

FIG. 6B is also a SEM photomicrograph of a surface of a woolen fiber in Comparative Example;

FIG. 7 is a schematical cross-sectional view of the deep-colored fibers in more preferable embodiment of the invention;

FIG. 8 is a schematic view of an example of an apparatus for plasma treatment employable in the process of the present invention; and FIGS. 9 and 10 are SEM photomicrographs (10,000 magnifications) of the surfaces of the deep-colored fibers in a preferable embodiment of the invention before and after coating of an abrasion resistant film, respectively.

DETAILED DESCRIPTION OF THE INVENTION

In the present invention, the fibers of which materials are not specifically limited may include natural fibers such as cotton, wool, silk and the like, all other synthetic and artificial fibers such as polyesters, nylons, acrylics, rayons, cellulose acetate and the like. This invention is very effectively applicable to an improvement of fibers having smooth surfaces, a high refractive index and a strong surface reflection, for example, polyester fibers.

The form of the fiber is not specifically limited. It may be filaments, staple fibers, yarns, threads, strands, ropes, woven fabrics, knitted goods, nonwoven fabrics, flocked fabrics, pile fabrics, etc. When the fibers exist as a component in a sheet-like fibrous structure such as woven fabrics, knitted goods, nonwoven fabrics and the like, the present invention can apply effectively.

The term "coloring" is to be understood to mean coloring of the whole surface of the objective fibers or coloring of a patternized part of the surface of objective fibrous structure. The coloring may be performed before or after formation of the resinous film coating. Though it is usual to color before the formation of the film coating, a post-coloring can be conducted effectively, particularly in the case of the coloring in part such as printing or the like.

According to the present invention, it is necessary to provide surfaces of the fiber with a film coating of a resin mixture comprising at least two kinds of resins that are incompatible with each other. The number of the resins to be mixed may exceed two as long as such is not contrary to the objects of the present invention. For simplicity, in the first embodiment of the invention, the resin mixture is accounted to comprise two resins A and B, hereinafter. The resins A and B are incompatible with each other and preferably have a good mutual miscibility. More preferably, the film coating comprising the resins A and B is excellent in transparency and uniformity and high in strength and durability. Additionally, the refractive index $n_A$ of one resin A is preferred to be lower than the refractive index $n_O$ of the fiber and the refractive index $n_B$ of the other resin B. For example, the refractive index $n_A$ is usually 1.35–1.50, preferably 1.37–1.48 and the refractive index $n_B$ is usually 1.40–1.60.

The mutual miscibility and incompatibility of the resins A and B are accounted for by the phenomenon that when these resins are mixed together, a good mixture but a homogeneous phase is formed, separating into the resin A phase and resin B phase. If the mutual miscibility is poor, gellation, viscosity increase or precipitation will occur, not forming a good resin mixture of the resins A and B, that is to say, a good film coating cannot be formed. It is not to mention that good deep-colored fibers are difficult to manufacture with industrial advantages. Further, the mutual incompatibility of the resins A and B is accounted for when these resins mixed well together are not integrated into a single phase but remain phase-separated. This condition can be observed by an electron microscope or optical microscope.

In the present invention, when the resins A and B are mixed together, with an extremely unbalanced mixing ratio, the resin of the larger amount forms a continuous phase (a sea-component) and the resin of the smaller amount forms a discontinuous phase (an island-component). If mutually compatible, the resins A and B become homogeneous in the molecular level, not only losing their own characteristics but also lacking in heat resistance and physical and chemical stabilities. Thus the color deepening effect cannot be so much expected.

In the present invention, it is preferred that the affinity for the fibers of the resin A that is lower in refractive index is also lower than the affinity for the fibers of the resin B that is higher in refractive index.

A typical example of such resin A is a silicone resin. Silicone resine are generally excellent in film-formability and transparency, having a low refractive index. Any silicone resins A having a basic skelton structure,

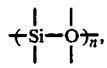

may be employable without specific limitations. In view of feasibility in use, film-formability on the fibers, etc., those having a good dispersibility in water are preferred.

In order to improve the dispersibility in water, film-formability and tenacity of the film, modifying groups containing an amino group, hydroxyl group, epoxy group, alkoxyl group, silanol group, carboxyl group, etc. may be introduced to side chains or terminals of molecules of the resin A. The introduction of the modifying groups can control affinity for the fibers, i.e., adhesiveness to the fibers and further attain improvements in film-formability, film tenacity, etc., so that it is preferred. For example, in the case of an epoxy group modified dimethylsilicone resin, the epoxy equivalent (the molecular weight of the silicone resin per one epoxy group) is at most 100,000, preferably at most 50,000, more preferably at most 10,000. The molecular weight of the resin A and the structure and molecular weight of side chains influence the dispersibility in water, adhesiveness, film tenacity, durability, etc. Though the molecular weight of the resin A is not specifically limited, it is usually at least 5,000, preferably at least 10,000, more preferably at least 30,000 in view of the dispersibility in water, adhesiveness to the fibers, tenacity and durability of the film, characteristics for plasma etching, etc. If the molecular weight is less than 5,000, the adhesiveness to the fibers and durability of the film will decrease as well as the incompatibility with the other resin will decrease, which may result in deteriorations of uniformity of the film and color-deepening effect.

The size of side chains of the resin A affects the refractive index, transparency, film tenacity and plasma etching property. If the molecular weight of the side chains becomes too large, the refractive index also increases, so that it is not preferred. Accordingly, as the side chain of the resin A, lower alkyl groups of about $C_1$-$C_{12}$ are preferred, more preferably of about $C_1$-$C_6$. To improve heat resistance and film-formability, the side chains may contain benzene rings, unsaturated bonds, amino groups, epoxy groups, hydroxyl groups, alkoxyl groups, etc. In particular, those which can cross-link the silicone resins with the aid of catalysts, heat, light, etc. to improve the chemical stability and mechanical strength are preferred with respect of abrasion resistance and solvent resistance. For example, polyorganosiloxane diol having hydroxyl groups and alkylhydrogen silicones having hydrogens as the side chains readily form cross-linkages by heating. Addition of a hardening agent to a reactive silicone also can achieve the cross-linking. Additionally, amino-modified silicones, epoxy-modified silicones, etc. and those containing vinyl groups or unsaturated bonds at molecular ends are preferred because of a high reactivity.

As the other resins, there is no specific limitation as far as they are miscible and incompatible with silicone resins. Those having excellent transparency, film-formability (uniform and strong film forming ability) and durability are preferred. Such resins include, for example, acrylic resins, modified acrylic resins such as partially fluorinated acrylics, polyethylene glycol modified acrylics, epoxy modified acrylics or the like, melamine resins, fluoro-resins, amido-resins, polyester resins, polyurethane resins, ethylene/vinyl acetate copolymers, polyether-ester resins, etc. The resins having a good dispersibility in water and a dispersion stability o forming small emulsified particles, inter alia, are preferred.

A preferable combination of the mixed resins is a silicone resin as one resin A with a partially fluorinated acrylic resin, polyurethane resin or polyether-ester resin as the other resin B.

The film coating comprising a mixture of the resins A and B is formed on the fiber in an amount of 0.2–15%, preferably 0.5–10%, more preferably 1–7% based on the weight of the fiber. If it exceeds 15% by weight, the film coating will not be formed uniformly and problems such as change of the hand, deteriorations of moisture or air permeability, dull color caused by a thick resinous layer, or the like, will occur. If it is less than 0.2% by weight, the film tenacity and color-deepening effect will be insufficient.

The mixing ratio of the resins A and B in the resin mixture, though it is not necessarily limited as long as those resins remain good in mutual miscibility and incompatibility, is preferably in the range between 90/10 and 10/90 more preferably between 80/20 and 20/80, particularly preferably between 70/30 and 30/70, by weight.

As to the color-deepening, the mixture of the resins A and B deepens color far more than the resin A or B alone. In FIG. 1, its example is shown. When the resin A is more than 90% by weight and the resin B is less than 10% by weight, the resin mixture does not completely solve the aforementioned problems inherent in silicone finishes and it does not provide sufficient durability. Alternatively, when the resin A is less than 10% and the resin B is more than 90%, by weight, the development of the color-deepening effect is not sufficient.

It is important to specify the mixing ratio of the resins in the mixture and the add on amount of the mixture for developing most effectively the color-deepening effect. Though it has not been elucidated, the reason for the above is accounted as follows. The mixed resins A and B form a mutually phase-separated structure on the fiber by virtue of their mutual incompatibility. The magnitude of the phase-separation, namely, the figure and size of the domains of the resin A and B phases, as influenced by the properties and mixing ratio of the resins A and B; they cannot be mentioned summarily. However, the resin of a larger amount in the mixture is apt to become a sea-component that is a continuous phase, while the resin of a smaller amount is apt to become an island-component that is a discontinuous phase.

That is to say, if the ratio of the resin A to the resin B is in the range between about 90/10 and 80/20 by weight, the resin B is apt to become an island component and inversely, if the ratio of the resin B to the resin A is in the range between about 90/10 and 80/20 by weight, the resin A is apt to become an island component. If the ratio, resin A/resin B, ranges from 70/30 to 30/70 by weight, the resin of the less amount tends to become the island component and, however, there may be the case where those resins do not clearly form the sea or islands but form a complicated configuration. In most cases, the color-deepening effect is prominently developed when those resins are relatively closer to the equal amount in the range of the mixing ratio from 70/30 to 30/70 by weight.

The film coating of the resin mixture formed on the fibers has smooth surfaces. However, inside the film coating, the resin mixture is in a complicated, phase-separated form and optical properties largely vary from phase to phase to change delicately the reflection and refraction of incident light beams, whereby the color-deepening effect is considered to develop. In other words, respective resin phases in a phase-separated form, all different in optical properties, are considered to derive a color-deepening effect as a surface having recesses and projections exhibits.

The size and figure of the separated phases in the film coating of resin mixture can be determined by phase-contrast microscope observation, X-ray fluorescence analysis, etc. Additionally, in the case where the observation of the phase-separated conditions on the fibers is difficult, the resin mixture applied on a film can be observed by the above means.

As a result of the observation on biaxially oriented polyethylene terephthalate film, when the ratio of the silicone resin A to the polyether-ester resin B was 90/10, the phase-separation of the film coating of the resin mixture was in the condition that the separated resin phase forming the island component was at least 0.05 $\mu$m in size for the smallest, mostly at least 0.1 $\mu$m. When the ratio of the resins, A/B, was about 80/20, the island components, though some were 0.1 $\mu$m or less, mostly were about 0.5-1 $\mu$m in size. Further, when the ratio of the resins, A/B, was 70/30, though some were yet about 0.1 $\mu$m, most part was at least 0.5 $\mu$m in size and partly the island components become to form relatively long continuous phases. When the mixing ratio of the resins, A/B, is in the range between 60/40 and 40/60, both the resins become either of the island-component and sea-component, forming a very complicated configuration. The color-deepening effect is most prominently developed in this range.

Further, when the resin A is so selected as to be lower in affinity for the fiber than the resin B, the resin A phase in the film coating of the resin mixture exists in predominant domains defined, being distinct from the other resin B phase, by interfaces substantially perpendicular to or inclined so as to widen the domains towards the surface of the film coating. In this case, when the refractive index $n_A$ of the resin A phase is lower than the refractive index $n_S$ of the resin B phase and the refractive index $n_A$ is lower than the refractive index $n_0$ of the fiber, it is conjectured that incident light beams are delicately reflected by and refracted at the finely separated phases and considerable part of the light is eventually absorbed to augment the color-deepening effect.

Next, the process for manufacturing the deep-color fibers of the first embodiment according to the present invention will be explained in more detail.

To the aforementioned fibers such as natural fibers, synthetic fibers, or fabrics such as woven fabrics, knitted fabrics, mixed yarn fabrics, blend knitted fabrics or the like, an aqueous dispersion of a mixture of at least two resins having good mutual miscibility and mutual incompatibility is applied in an amount of 0.2-15% based on the weight of the fiber or fabric. To apply the resin mixture onto colored fabrics composed of natural fibers or synthetic fibers, any of conventional processes can be employed, such as a soaking and adsorbing process wherein the fabrics are impregnated with a resin dispersion, squeezed and then subjected to drying or drying followed by dry heating, wet heating or high temperature wet heating treatment; a coating process wherein a resin dispersion is applied with a gravure coater or the like, followed by the above heat treatment; and the like, and, inter alia, the soaking and adsorbing process is most preferred. In order to form a uniform film coating of the resin mixture on the fibers by the soaking and adsorbing process, the concentration of resin in the dispersion of the resin mixture is adjusted to be usually not exceeding 15%, preferably not exceeding 10%, more preferably not exceeding 7%, by weight. To improve the stability in a mixed state of the resins in the dispersion, i.e., the stability of the dispersion, a surface active agent, for example, a usually used cationic surfactant, nonionic surfactant or anionic surfactant, may be added in an amount of not exceeding 50%, more preferably not exceeding about 20%, based on the weight of the resin mixture. The amount of the resins to be deposited on the fibers can be adjusted by controlling concentration of the resins in the dispersion, the amount of the dispersion to be applied to the fibers, frequency of the application of the dispersion, etc. The resin mixture is deposited in an amount of 0.2-15%, preferably 0.5-10%, more preferably 1-7%, by weight. An amount of less than 0.2% by weight is not preferred for the objective color-deepening effect is hardly obtained. Alternatively, if it exceeds 15% by weight, not only the hand of the treated fabrics tends to become stiff but also the resins tend to hinder the fabrics from any further finishings.

After forming the film coating of the resin mixture, it is preferred to subject the finished fibers or fabrics to washing with water or hot water, or a brief soaping treatment to improve fastness to crocking, sublimation resistance, heat resistance, etc. Particularly, the washing with hot water after the formation of the film coating can appreciably lower the L-value.

In a different preferable embodiment, the second embodiment, of the present invention, at least two resins different in solvent-solubility are employed to form the film coating on the surfaces of the fibers. In this case, one resin and the other resin are incompatible with each other but mutually well miscible. More preferably, these resins form a film that is good in transparency, uniformity, tenacity and durability. In addition, the resin that is lower in solvent-solubility and dissolving rate (hereinafter referred to as "resin A'") is also lower in refractive index than the other resin that is higher in solvent-solubility and dissolving rate (hereinafter referred to as "resin B'").

When a film coating composed of two kinds of resin, A' and B', different in solvent-solubility is soaked in or contacted with a solvent such as water, alkaline solution, acidic solution or the like, the mutually incompatible and distinctly separated resin phases are different in degree of elution and, therefore, pits and/or recesses and projections are formed on the surfaces of the resinous film. Preferable combinations of resins A' and B' to be mixed depend on the solvent to be employed. As an insoluble component to remain, resins A' good in transparency, excellent in film-formability and physical properties and low in refractive index are preferred. Such resins A' include, for example, various kinds of fluoro-resin, partially fluorinated resins, and silicone resins, etc. As the silicone resins, inter alia, those chemically stabilizable and physical strength improvable by cross-linking with the aid of catalysts, heat, light or the like are preferred in respects of withstandability for eluting treatment and abrasion resistance during using. For example, organosilicones having an active hydrogen containing group, hydroxyl group, alkoxyl group, epoxy group, amino group, carboxyl group, alcoholic group, etc. in the polymer, or silicone resins having a vinyl group, unsaturated bond, etc. as a molecular terminal group (hereinafter referred to as "modified silicone") are readily cross-linked by heating to form chemically and physically stabilized silicone films. Further, a combination use of modified silicones with a cross-linking agent such as aminoalkoxysilanes, vinylalkoxysilanes, epoxyalkoxysilanes and the like is preferred to form chemically and physically more stabilized films.

Alternatively, as a soluble component, resin B' to be removed, employable materials are, for example, water-soluble macromolecular materials such as starch, dextrins, gelatins, peptides, proteins, polysaccharides, polyamino acids, polyethylene oxide, polyethylene glycol, polyacrylic acid, polyacrylamide, carboxymethyl cellulose, hydroxyethyl cellulose, methyl cellulose, hydroxypropylmethyl cellulose or the like, and organic solvent soluble synthetic polymers such as polymethyl acrylate, polyethyl acrylate, polyisopropyl acrylate, polyvinyl formate, polyvinyl acetate, trinitrocellulose, polystyrene, polyvinyl chloride, styrene/butadiene copolymers, acrylonitrile/butadiene copolymers or the like.

The film coating of the mixture of the resins A' and B' is provided on the fibers in an amount of not exceeding 15%, preferably 0.2–10%, more preferably 0.3–7%, particularly preferably 0.5–5%, based on the weight of the fiber. If it exceeds 15% by weight, the film coating will not be formed uniformly and problems such as change of the hand, deteriorations of moisture or air permeability, dull color caused by a thick resinous layer, or the like will be apt to occur. Alternatively, if it is less than 0.2% by weight, the formed resinous film is so thin that the development of the colordeepening effect and the durability will lessen and so not preferable.

The mixing ratio of the resins A' to B' in the resin mixture, though it is not necessarily limited as long as these resins remain good in mutual miscibility and incompatibility, is preferably in the range between 95/5 and 10/90, more preferably between 90/10 and 25/75, particularly preferably between 80/20 and 50/50, by weight. When the resin A' is more than 95% by weight and the resin B' is less than 5% by weight the resin mixture does not completely solve the aforementioned problems inherent in silicone finishing agents nor provides sufficient durability, and so not preferable. Alternatively, when the resin A' is less than 10% by weight and the resin B' is more than 90% by weight, the resin A' to retain will become hard to remain during or after elution of the resin B'. Further, even if it remained, the formed recesses and projections would comprise predominantly the projections so that the color-deepening and color durability would not be sufficient.

That is to say, it is important to specify the solubility of the mixture of the resins A' and B', the difference in dissolving rate, the mixing ratio and the add-on amount for developing most efficiently the colordeepening effect. Though it has not been elucidated, the reason for the above is accounted as follows. The mixed resins A' and B' form a mutually phase separated structure on the fiber surfaces by virtue of their mutual incompatibility. In this case, when the mixing ratio, A'/B', is in the range between 90/10 and 25/75, the color-deepening effect is the most. In the above range, the resin of the less amount tends to become the island component and, however, generally those resins do not clearly form the sea or islands but a complicated configuration. The form of the phase separation or the figure of the recesses formed by removing one resin by dissolving in solvent is considered to be effective for the development of deep color, as the recesses are not so small and in a relatively continuous and complicated configuration. However, as mentioned hereinbefore, the figure and size of the phase-domains are largely influenced by physical properties of the resins A' and B'.

The film coating of the resin mixture on fiber surfaces has recesses and projections which are one of the factors for developing a deep color. The figures of the recesses and projections, as interpreted according to the literal sense, are rugged forms. A preferable form is materially pits that are formed by subsiding parts of the surface of the resinous film. More preferably, pits are formed by preferential dissolution or elution of domains of a resin phase other than the resin A' in the phase-separated resinous film. By forming such pits, a resinous film coating that is excellent in color-deepening effect, abrasion resistance, washing withstandability and drycleaning withstand ability can be provided. The figure, size and number of the pits are not specifically limited, though with respect to the size, the area occupied by the pits per unit surface area is usually not exceeding 50%, preferably 5–40%, more preferably 7–30%. The number is usually not exceeding 30 per 1 $\mu m^2$, preferably not exceeding 25 per 1 $\mu m^2$, more preferably 1–20 per 1 $\mu m^2$. If the area ratio of the pits exceeds 50%, it is not preferable because not only will the color-deepening effect not augment but also the abrasion resistance, luster, etc. will reduce. Further, with respect to the number, though it is affected by the area ratio, size etc. of the pits, if it exceeds 30 per 1 $\mu m^2$, either the pit size or distance between adjacent pits becomes so small that the abrasion resistance and luster reduce disadvantageously. The size and number of the recesses and projections on the resinous film surfaces can be determined by an electron microscope observation.

The more the edges of the recesses and projections or pits formed on the resinous film surfaces and the angles made by the resinous film surfaces and the peripheral walls of the pits, the more effective is the color-deepening. In the recesses and projections described in prior references, for example, FIG. 4 of Japanese Patent Application Laid-open No. 55-107,512, the angles made by the inclined surfaces of the recesses and projections and the fiber surfaces are not so acute that the recesses and projections consist of gentle slopes and, therefore, the color-deepening effect has been insufficient.

Formation of the recesses nd projections on the film coating of the resin mixture can be effected by removing by dissolving of one resinous component, that is, elution of one component, in virtue of the difference in solvent-solubility between the resins A' and B'. As the resin B', particularly preferred are those readily removable by dissolving in hot water, water, alkaline solutions, acidic solutions, alcohol and alcoholic aqueous solutions. In the formation of pits or recesses and projections according to conventional eluting processes, water-soluble or solvent-soluble salts or low-molecular compounds admixed in a polymer are removed by elution after spinning. According to these processes, only wide-mouthed and gently sloped pits or recesses are obtainable. It is ascribed to the state of existence in fibers of the salts or low-molecular compounds as well as the fact that the elution of only the salts or low-molecular compounds cannot form sufficiently defined pits or recesses and projections so that the dissolution progresses further to a part of the polymer. In contrast, according to the present invention, the film coating is composed of a mixture of at least two resins being incompatible with each other, wherein phase-separated domains of one resin have acute edges defined by domains of the other resin and these domains in a phase-separated state can separate easily from each others. Accordingly, in the present invention, the pits or recesses and projections formed after elution of one component have acute edges.

The process for eluting at least one component (resin B') from the resin mixture is effected by making use of the difference in solubility and degree of dissolution between at least two components in the resin mixture. In this process, the eluting treatment is carried out preferably so as to that there remains the resin component that is lower in refractive index. To heat during dissolution or to impart ultrasonic vibrations or rumpling motion is preferred. For example, in the case where one resin is a silicone resin and the other one is a water-soluble resin such a polyethylene glycol, polyvinyl alcohol, methoxycellulose, starch or the like, an ordinary washing with water can elute the resin component except the silicone resin and provide the surfaces of the film coating with pits formed by elution of the water-soluble resin component. Alternatively, in a combination of perfluoroalkyl acrylate as one resin component with polyvinyl acetate, polyethylvinylether, polyvinyl pyridine, polyvinyl alcohol or the like as the other resin component, methanol can elute the other resin component to form pits.

The higher the mutual incompatibility of the resin components, the more clearly defined pits or recesses and projections can be formed by virtue of the difference in solubility and rate of dissolution in sol vent, without the components mingling with each other.

The solvents are preferred to be good solvents for one component and bad solvents or non-solvents, even having no swelling effect, for the other component.

After the elution of one resin component, washing-off of the solvent, scouring and drying are performed. Additionally, hydrophilic finishes, water-repellent finishes, crease-proof finishes, electrostatic-proof finishes or the like may be applied, if required.

The ratio of solubility or dissolving rate of the resin A' to the resin B' is generally not more than ½, preferably not more than 1/10. Therefore, the dissolution of the resin B' component preferentially progresses from film coatings. More preferably, the dissolving treatment is carried out with a solvent that cannot dissolve the resin A' but the resin B' only. Namely, since the resins A' and B' are phase separated and the resin A' is lower in solubility and dissolving rate, the resin B' is eluted in a short period of time to form fine recesses and projections, preferably fine pits. By thus forming recesses and projections, preferably pits, in the film coating, a deep color is effectively developed and fibers having a deep color excellent in durability can be obtained.

If the resin B' is so selected as to be higher than the resin A' in affinity for polyester synthetic fibers, for example, a silicone resin for A' and a polyether-ester resin for B', the proportion of the resin B' existing in the film coating of the phase-separated resin mixture is high in the vicinity of the polyester fiber and decreases towards the surface of the resinous film. Reversely, the proportion of the resin A' is high in the vicinity of the surfaces of the resinous film and decreases towards the surfaces of the fiber. Such a combination of resins therefore forms virtual pits to provide a very good color-deepening property.

In a further different more preferable embodiment, the third embodiment, of the present invention, at last two resins incompatible with each other and different in plasma etching resistance are employed to form the film coating on the surfaces of the fibers. By subjecting to plasma etching, the fibers provided with such a film coating can be turned into deep-colored fibers having pits on at least a part of the surfaces of the fibers.

In the above embodiment, the resin that is higher in plasma etching resistance (hereinafter referred to as "resin A'''") is preferred to be lower in affinity for the fiber than the other resin that is lower in plasma etching resistance (hereinafter referred to as "resin B'''").

The term "difference in plasma-etching resistance" is to be understood to mean the difference in plasma etching rate. For example, when a fiber or fabric having a film coating of the resin mixture placed in low-temperature plasma is treated with plasma etching, the mutually incompatible and distinctly separated resin phases are different in degree of etching and, therefore, pits are formed on the surfaces of the fiber. As the resin A" having a high plasma etching resistance, mention may be made of, for example, saturated hydrocarbon resins, unsaturated hydrocarbon resins, polyamide resins, silicone resins, modified silicone resins, polyperfluoroethylene resins, and the like, and particularly amino modified silicones, epoxy modified silicones and silanol modified silicones are preferred. As the resin B" having a low plasma etching resistance, mention may be made of cellulosic resins and derivatives thereof, polyethylene glycol, polyether-ester resins, acrylic resins, fluorinated acrylic resins, derivatives thereof, polyurethane resins and the like.

When a resin that is high in plasma etching resistance, excellent in transparency and film-formability and low in refractive index is used as the resin A" component, the color-deepening effect is particularly improved.

Silicone resins, since they are excellent in film-formability and transparency, and low in affinity for the fiber and refractive index, are particularly preferred as the resin A" that is high in plasma etching resistance.

The film coating of the resin mixture is provided on the fibers in an amount substantially same as that explained hereinbefore regarding the solvent-soluble resin mixture in the second embodiment of the invention.

The mixing ratio of the resins A" to B" in the resin mixture, through it is not necessarily limited as long as these resins remain good in mutual miscibility and incompatibility, is preferably in the range between 97/3 and 10/90, more preferably between 95/5 and 20/80, particularly preferably between 90/10 and 30/70, by weight. As to the color-deepening, the mixture of the resins A" and B" deepens color far more than the resin A" or B" alone. When the resin A" is more than 97% by weight and the resin B" is less than 3% by weight, the resin mixture cannot completely solve the aforementioned problems inherent in silicone finishes nor provide sufficient durability, so that is not preferable. Alternatively, when the resin A" is less than 10% and the resin B" is more than 90%, by weight, the form of the recesses and projections tends to become relatively simple, monotonous and fine though the number is large, or become gently sloped having little inclined surfaces and, therefore, the development of the color-deepening effect will be insufficient. Namely, by specifying the difference in plasma-etching resistance between the resins A" and B", the mixing ratio and add-on amount, the color-deepening effect is most effectively developed. Though it has not been elucidated yet, the reason for the above is accounted as follows.

The mixed resins A" and B" form a phase-separated structure on the fiber by virtue of their mutual incompatibility. Generally when the mixing ratio, A"/B", is in the range between 90/10 and 30/70, the color-deepening effect is the most. The above fact is considered to be attributed to the form of the phase-separation or the figure of the pits formed through etching, that is not so small and in a relatively continuous and complicated configuration, so that the figure of the pits is effective for the developement of a deep color.

In this embodiment of the invention, the pits on the fiber surfaces may exist in at least a part of the fiber surfaces, such as the surfaces of the fibers existing in the surface of a fibrous structure, for example, fabrics. The pits do not have to exist over the entire surface of the fiber.

As to the form, size, number, etc. of the pits, the same as the foregoing second embodiment can apply.

The formation of pits on the film coating of the resin mixture can be effected by using known plasma etching techniques, utilizing the difference of plasma etching resistance. Particularly, the low-temperature plasma etching processes are preferred because fine pits having acute-angled edges can be formed. The more acute angles made by the peripheral walls of the pits and the fiber surfaces, the more effectively develops the color-deepening effect.

As shown in FIG. 3, if an angle $\theta$ formed by a surface 3 of the resinous film and a peripheral surface of a pit is acute, the major part of an incident light beam 1 coming into the pit is absorbed into the fiber, over a wide range of angles of incidence of incident light beams. In contrast, as shown in FIG. 4, if the angle $\theta$ of the recesses is obtuse, the recesses reflect a considerable part of the incident light 1.

In this embodiment of the invention, the resins A" and B" are different in plasma etching rate. The resin B" is easier to be etched than the resin A" by a factor of at least 1.2, preferably at least 1.5, more preferably at least 2, so that the resin B" phase is preferentially etched among the components composing the film coating. Namely, since the resins A" and B" are phase-separated and the resin A" is lower in etching rate, the resin B" is removed by etching in a shorter period of time to form recesses, i.e. fine pits, defined by walls of the resin A" having a lower refractive index. Thus by virtue of the low refractive index of the resin A" phase and the pits formed in the film coating, a deep color develops effectively and fibers having a deep color excellent in durability can be obtained.

With respect to affinity for fibers, e.g., polyester synthetic fibers, of the resins A" and B" to be mixed, if the resin B" is so selected as to be higher than the resin A" in affinity, for example, a silicone resin for A" and a polyether-ester resin for B", in the film coatings of the mixture of the resins A" and B" provided on the polyester synthetic fibers, the proportion of the resin B" existing in the film coatings of the phase-separated resin mixture is high in the vicinity of the polyester fiber and decreases towards the surfaces of the resinous film. Reversely, the resin A" is considered to have a density gradient such that the proportion of the resin A" is high in the vicinity of the surfaces of the resinous film and decreases towards the surfaces of the fiber. Such a resinous film coating improves the color-deepening properties after the formation of the pits. In the most preferable cases, most of the pits preferentially formed by plasma etching have depths rather broader than the mouth as shown in FIG. 3. The formation of such pits has never been proposed before the present invention. As shown in FIG. 3, since the pits have a narrow mouth and broad depths, light beams 1 coming into the pits are extremely difficult to go out of the pits as reflected light 2, so that the major part of the incident light 1 is absorbed as refracted light 2' into the fiber. In contrast, hitherto proposed recesses and projections are in a form like indentations 4 with a virtually constant inclination as if they were screw threads as shown in FIG. 4. Therefore, such a rugged surface reflects the major part of the incident light 1, as reflected light 2, so that even if many recesses and projections are provided, the color-deepening effect has not been enough (for example, as is seen in FIG. 4 of Japanese Patent Application Laid-open No. 55-107,512).

The pit forming method to be preferably employed in the process of the present invention is an etching method with the use of low-temperature gas plasma. The low-temperature gas plasma is meant by a non-equilibrium plasma wherein electrons have a temperature sufficiently higher than that of ions or other active atoms. As a method for generating this plasma, any of known methods can be employed, such as described in "Techniques and Applications of Plasma Chemistry", edited by J. R. Hollahan and A. T. Bell, published by John Wiley & Sons, New York, 1974, and "Plasma Chemistry of polymers", edited by M. Shen, published by Dekker, New York, 1976. Summarily, an ionizable gas is introduced into a vacuum chamber provided inside with parallel plate electrodes and a plasma can be produced by applying high frequency. Further, the ionized gas plasma also may be produced by an electric field formed by means of an outer inductive coil. The apparatus for plasma treatment is preferred to have inner parallel plate electrodes or a drum-like, cylindrical electrode from the standpoints of treating efficiency, stability of quality and productivity.

As a gas to be used, for example, inorganic non-polymerizable gases such as Ar, $O_2$, $N_2$, $H_2$, air, $H_2O$, $CO_2$ and the like, and organic gases having good etching properties such as $CF_4$, $CF_3C$, $CF_2C_2$ and the like, are employable. These gases can be used alone or in combination.

The gas pressure largely influences etching behavior, quality of etched articles, etc. In the case of $O_2$ gas, it is generally 0.2–5 torr, preferably 0.3–2 torr, more preferably 0.5–1 torr. If less than 0.2 torr, the etching rate will be too low to develop a sufficient color-deepening effect. If more than 5 torr, the oxidation reaction will become so active that washing or melting of the fiber surfaces will occur. Alternatively, in the case of $N_2$ gas, it is generally not exceeding 1 torr, preferably not exceeding 0.8 torr, more preferably not exceeding 0.6 torr. Additionally, in the case of Ar gas, it is generally not exceeding 5 torr, preferably 0.2–3 torr, more preferably 0.5–2 torr.

The pits and/or recesses and projections formed by plasma etching are provided on the part that plasma electrons or active gases contact and, therefore, tend to concentrate on the front surface of fabrics such as woven or nonwoven fabrics, knitted goods or the like and they are scarcely formed on the back surface or inner part thereof. Accordingly, the figure or treating surface of the fibers are adequately selected according to the object and use.

For applying high voltage, any of direct current, alternating current and high frequency can be used. However, in view of feasibility of plasma generation and stability and uniformity of the generated plasma, application of low frequency or high frequency is preferred, more preferably a high frequency of several MHz to several tens of MHz.

The output of the high frequency is usually 0.01–5 W/cm$^2$, preferably 0.02–3 W/cm$^2$, more preferably 0.04–2 W/cm$^2$. The treating time is at least several seconds, preferably at least 10 seconds, particularly preferably at least 30 seconds. The more the output, the shorter the treating time and, however, the optimum conditions should be selected in connection with quality and cost.

The coloring of the fibers may be conducted either before or after the plasma treating process or the resin finishing treatment. However, the before plasma treating is preferred for preservation of etched pits.

After the plasma etching treatment, if required, washing with water and drying, or if further required, a post treatment, such as hydrophilic finish, water-repellent finish, crease-proof finish, antistatic finish and the like, can be conducted.

In FIG. 8 illustrating a typical apparatus to be used for the low-temperature plasma treatment according to the present invention, in a bell-jar type reactor 2 made of glass, an antenna electrode 3 connected with a high-frequency generator 1 and a grounded electrode 5 parallel therewith are provided. The grounded electrode 5 is controlled at an appropriate temperature by a temperature controller device 6. The inside of the bell-jar 2 can be vacuumized by means of a vacuumizing system including an exhaust gas control valve 7, cooling trap 8 and vacuum pump 9. Gases are introduced by means of a gas introducing system including a control valve 10, flow-meter 11 and a gas cylinder 12.

In the present invention, fibers 4 (hereinafter referred to as "article to be treated") are placed within a plasma sheath formed in the vicinity of the antenna electrode 3, preferably within 5 mm from the antenna electrode, more preferably in contact with the antenna electrode. In conventional processes, since the article to be treated is arranged on the grounded electrode 5 or between the antenna electrode 3 and grounded electrode 5, spacing from both electrodes, the rate and effect of color deepening treatment are low, so that a large scale treating apparatus has been required in order to increase the color-deepening effect to a certain extent. Further, in order to develop a distinct color-deepening effect, it has been necessary to increase the output of the high frequency or low frequency and treat for a long period of time. However, the high output and long time treatment have had influences such as changes in property of materials or dyestuffs, discoloration or the like, with generation of heat or light, particularly ultraviolet ray, such as near or far ultraviolet ray.

Though the reason why placing the article to be treated within a plasma sheath, preferably contacting with the antenna electrode 3, produces a good effect, has not been elucidated yet, it is conjectured that a negative self-bias is produced in the antenna electrode, that accelerates positive charged particles in the plasma to run against the article to be treated. The color-deepening rate is clearly represented by the change of L-value, that is at least 1.5 times, preferably at least 2 times, more preferably at least 3 times the conventional treating rate. The problem is that there occurs a large temperature rise of the antenna electrode caused by collision of electron particles having high kinetic energy. However, cooling or temperature controlling of the antenna electrode, preferably with pure water, an organic solvent or a heat-conductive gas having a low electric conductivity, allows the treatment to be carried out for a long time. Thus, the heat control of the antenna electrode not only can prevent the article to be treated from deformation and change of properties with heat but also is effective for stabilizing the plasma. Particularly, it is extremely important when plasma treatment is practised for a long period of time as bringing the article to be treated into contact with the antenna electrode.

The fibers having a resinous film coating having pits and/or recesses and projection on its surfaces (hereinafter referred to as "resinous film coating I") obtained by means of solvent-elution or plasma-etching process according to the second or third embodiment of the present invention can be turned to excellent abrasion resistant deep-colored fibers by further depositing a resinous film coating (hereinafter referred to as "resinous film coating II") on the resinous film coating I according to the fourth embodiment of the invention.

The fibers having a resinous film coating having recesses and projections, preferably pits, look color-deepened vividly by virtue of reduction of both the surface defused reflection and specular reflection due to the recesses, preferably pits. However, since the size of the pits is considerably small, that is about 0.1–1 μm in diameter, the pits are readily worn away and, besides, conditions of the fiber surfaces are changed due to abrasion or heating of the fibers, so that partial discoloration and unevenness of color become noticeable. Although such an unevenness of color is not so noticeable when the degree of color-deepening is as low as that shown in the aforementioned reference, U.S. Pat. No. 4,400,424, for example, L-value of 11–13, it becomes noticeable when the level of blackness, L-value, is lower than 10. We, the inventors, have obviated such drawbacks as discoloration and unevenness of color by forming the resinous film coating II on the resinous film coating I.

The resinous film coating II is preferred to be transparent and have a refractive index $n_\beta$ that is lower than the refractive index $n_0$ of the fiber. Needless to say, it is also preferred to exhibit a good film-formability on the resinous film I. For the resinous film coating II, employable resins include, for example, saturated hydrocarbon resins, unsaturated hydrocarbon resins, polyamide resins, silicone resins, modified silicone resins, polyperfluoroethylene resins and the like, particularly preferably, amino modified silicones, epoxy modified silicones and silanol modified silicones which are compatible with the resinous film coating I and can form transparent films having a low refractive index. The above resins may be incorporated with other resins or compounds such as silane compounds, modified silane compounds or the like to improve film-formability, tenacity, transparency, refractive index, abrasion resistance and the like of the resinous film coating II.

The resinous film coating II should exist on at least the fiber surfaces that undergo rubbing, preferably on the surface provided with recesses and projections or pits. The resinous film coating II is at most 0.5 μm thick, preferably 0.05–0.3 μm. If thicker than 0.5 μm, the color-deepening effect will decrease.

The resinous film coating II is formed preferably enough thin and uniform, so as not to fill up but to preserve the recesses or pits provided on the resinous film coating I.

As stated hereinbefore, the refractive index $n_\beta$ of the resinous film coating II is preferably lower than the refractive index $n_0$ of the fiber itself. The relation between the refractive indices $n_\alpha$ and $n_\beta$ of the resinous film coatings and H, respectively, is not specifically defined and, however, preferably $n_\beta$ is equal to or higher than $n_\alpha$.

Here, when the resinous film coating I comprises two resins different in refractive index, the refractive index of the resin that is lower in refractive index or solvent-solubility, or higher in plasma etching resistance is denoted as $n_{60}$.

As explained hereinbefore, the color-deepening property according to the fourth embodiment of the present invention, is directed typically to black color, particularly extremely dark, so-called "raven black", for example, such as represented by an L-value of less than 10, preferably not more than 9.5. In general, fabrics having an extremely high dyeability are liable to color-lightening or color-unevenness due to rubbing. In this embodiment of the invention, the difference of L-value ($\delta_L$) between before and after rubbing test is considerably small, preferably not exceeding 1.5, more preferably not exceeding 1, particularly preferably not exceeding 0.8. If δL is more than 1.5, color-lightening or color-unevenness will become so large during an ordinary use that product value will be much impaired and the use will be considerably limited. When δL is between 1 and 1.5, the fibers barely can be put to practical use, and if less than 1, they are in a level of practical use in considerably diversified uses.

The above preferable embodiment of the invention will be further explained in more detail with reference to the attached drawings.

In FIG. 7 which is a schematic cross-sectional view of the fiber of the fourth embodiment of the invention, the surface of a material fiber 1 is covered by a resinous film coating I that is further coated with a resinous film coating II. The reason for the improvement of abrasion resistance in this embodiment of the invention has not been elucidated, it is conjectured to be attributed to strengthening of adhesiveness to the material fiber of the resinous film coating I by virtue of the resinous film coating H, fastness to rubbing, disperse of frictional force, and slippiness of the surfaces of the resinous film coating II, etc.

The resinous film coating II may be provided on the resinous film coating I after pits or recesses and projections have been formed on the resinous film coating I, by a process similar to that for forming the resinous film coating I. Formation of the resinous film coating II right after plasma etching of the resinous film coating II, without subjecting to washing or any other treatment, is preferable in respects of uniform adhering, adhering strength and resistance to color-lightening with rubbing. After the formation of the resinous film coating II, if required, washing with water and drying, and if further required, hydrophilic finishes, water-repellent finishes, crease-proof finishes, antistatic finishes or the like, can be applied.

The deep-colored fibers according to the present invention are much better in color-deepening properties as well as in washing withstandability and fastness such as abrasion resistance and the like, than hitherto proposed fibers. Additionally, consumption of dyes or pigments can be reduced as compared with conventional fibers, owing to remarkable color-deepening properties or effect and, moreover, fading and transferring of color do not occur, so that the fibers of the present invention are excellent from the standpoints of quality and cost. Such deep-colored fibers of the present invention are not only very useful for black formal wears and the like for which blackness is the life and soul but also applicable to diversified textile products such as color formal or printed fabrics and the like.

Further, the process of the present invention is industrially very useful because it can provide deep-colored fibers having an excellent durability, with a small add-on amount of the resin mixtures, and can effectively roughen the surfaces of the fibers. Particularly, by treating articles such as fibers or the like within a plasma sheath formed in the vicinity of the antenna electrode, the treating rate and effect can be augmented extremely as compared with conventional processes, so that the process of the invention is very useful industrially, in view of prevention of the treating articles from change of qualities with ultraviolet rays or heat, cost-down, compaction of equipments, etc.

The present invention will be explained in more detail by way of examples hereinafter. In the examples, determination or evaluation of properties was performed according to the following methods.

A. Color-deepening property

In accordance with the C.I.E. 1976 (Lab) process, reflectance was determined by a color analyzer (AU Color System, manufactured by Kurabo Co., Ltd.) to obtain a Y-value, and an L-value was obtained according to the following equation.

$$L = 25(100Y/Y_o)^{\frac{1}{3}} - 16$$

The smaller the L-value, the higher the level of deepened color.

Additionally, ΔL is the difference between an L-value ($L_1$) after formation of the resinous film coating and an L-value ($L_2$) after eluting treatment. The larger the ΔL, the higher the color-deepening effect.

B. Color fastness

The color fastness was determined in conformity with JIS (washing fastness: JIS L-0860).

C. Mutual incompatibility

A liquidized resin mixture was applied on a film or glass plate to form membrane. The membrane was observed by an optical microscope, phase-contrast microscope, electron microscope or X-ray fluorescence analysis.

D. Etched pits, recesses and projections

Existence, size and the number of recesses and projections and pits were readily observed by an optical microscope and SEM. Further, with respect to the area of the pit opening, a SEM photomicrograph was taken with a large magnification and the area of the pit opening was determined from the photomicrograph or by means of a computerized picture-analysis.

E. Etched amount ΔW (weight %)

$$\Delta W = (W_1 - W_2)/W_1 \times 100$$

$W_1$: Weight of sample before treatment
$W_2$: Weight of sample after treatment F. Etching rate difference An aqueous dispersion liquid of a resin is applied thin onto a biaxially oriented film, dried at 100° C. for 20 minutes and cured at 120° C. for 5 minutes to form a film coating sample. Subsequently, a resinous film to be compared is cut into a small swatch sample (2-3 cm × 5-10 cm). Those samples are subjected to a plasma treatment under same conditions. Etching rate difference is represented by the ratio of percent weight reduction of the plasma-treated samples.

G-Rubbing test

Two fabric test-pieces were rubbed with each other 100 times under a load of 200 g by using the Type II rubbing tester JIS L-0849 (1971). The difference of L-value ($\beta L$) between before and after rubbing was determined.

EXAMPLE 1

A georgette fabric composed of a 60 d/48 f polyester filament warp yarn having an S-twist of 250 T/M and two kinds of 75 d/72 f polyester filament weft yarns having S- and Z-twists of 3000 T/M, respectively, was crimpled in a washer according to a conventional process and then heat-set in dry at 180° C. The fabric was further scoured with 20% caustic soda aqueous solution at 90° C. to reduce the weight of the fabric by 15%.

The resulting fabric was dyed with 15% o.w.f. of Kayalon Polyester Black GSF (a trade name of a disperse dyestuff manufactured by Nippon Kayaku Co., Ltd.) and then subjected to a reduction washing to provide a black dyed georgette crepe fabric.

Then, aqueous dispersion liquids comprising a silicone resin ($n_A = 1.41$) and a polyether-ester resin ($n_B = 1.48$) were prepared with various resin mixing ratios and applied onto the black dyed georgette crepe fabric, changing the add-on amount. The application of the resin mixture (formation of a film coating) was conducted by soaking the fabric in the aqueous dispersion liquid of the resin mixture first, squeezed with a mangle and then dried and cured with a pin-stenter-type hot-flue drying machine.

L-value and other data obtained on each fabric sample are shown in Table 1 and FIGS. 1 and 2.

Namely, in FIG. 1, A and B denote the silicone resin and polyether-ester resin, respectively, and a, b, c and d represent add-on amounts of 0.5%, 1%, 3% and 10%, o.w.f., respectively.

FIG. 2 shows change of L-value of the treated fabric with the amount of the film coating of the resin mixture composed of the silicone resin and polyetherester resin in an equal weight ratio.

TABLE 1

| Sample No. | Resin Mixture Mixing ratio | Add-on (% owf) | L-value | Fastness to crocking | Remarks |
|---|---|---|---|---|---|
| 0 | — | 0 | 11.4 | | Control |
| 1 | 100/0 | 0.5 | 11.2 | Poor | Comparative |
| 2 | 100/0 | 1 | 10.8 | Poor | Comparative |
| 3 | 100/0 | 3 | 10.3 | Poor | Comparative |
| 4 | 100/0 | 5 | 9.5 | Poor | Comparative |
| 5 | 100/0 | 10 | 9.2 | Poor | Comparative |
| 6 | 90/10 | 0.5 | 11.0 | | Present invention |
| 7 | 90/10 | 1 | 10.5 | | Present invention |
| 8 | 90/10 | 3 | 9.6 | | Present invention |
| 9 | 90/10 | 5 | 8.6 | | Present invention |
| 10 | 90/10 | 10 | 8.6 | | Present invention |
| 11 | 70/30 | 0.5 | 10.9 | | Present invention |
| 12 | 70/30 | 1 | 10.4 | | Present invention |
| 13 | 70/30 | 3 | 9.3 | | Present invention |
| 14 | 70/30 | 5 | 8.5 | | Present invention |
| 15 | 70/30 | 10 | 8.5 | | Present invention |
| 16 | 50/50 | 0.5 | 10.8 | | Present invention |
| 17 | 50/50 | 1 | 10.3 | | Present invention |
| 18 | 50/50 | 3 | 9.2 | | Present invention |
| 19 | 50/50 | 5 | 9.2 | | Present invention |
| 20 | 50/50 | 10 | 9.0 | | Present invention |
| 21 | 30/70 | 0.5 | 11.0 | | Present invention |
| 22 | 30/70 | 1 | 10.4 | | Present invention |
| 23 | 30/70 | 3 | 9.5 | | Present invention |
| 24 | 30/70 | 5 | 9.5 | | Present invention |
| 25 | 30/70 | 10 | 10.0 | | Present invention |
| 26 | 10/90 | 0.5 | 11.3 | | Present invention |
| 27 | 10/90 | 1 | 10.8 | | Present invention |
| 28 | 10/90 | 3 | 11.0 | | Present invention |
| 29 | 10/90 | 5 | 11.4 | | Present |

TABLE 1-continued

| Sample No. | Resin Mixture Mixing ratio | Add-on (% owf) | L-value | Fastness to crocking | Remarks |
|---|---|---|---|---|---|
| | | | | | invention |
| 30 | 10/90 | 10 | 11.2 | | Present invention |
| 31 | 0/100 | 0.5 | 11.4 | | Comparative |
| 32 | 0/100 | 1 | 11.3 | | Comparative |
| 33 | 0/100 | 3 | 11.6 | | Comparative |
| 34 | 0/100 | 5 | 12.0 | | Comparative |
| 35 | 0/100 | 10 | 11.8 | | Comparative |

Further, the samples Nos. 8, 13 and 18 were washed with hot water at 60° C. for 20 minutes. Then, the L-values of these samples decreased to 9.1, 8.8 and 8.8, respectively, after the washing.

EXAMPLE 2

A plain fabric composed of No. 40 count cotton warp and weft yarns was soaked in a padding bath containing 10% by weight of Remazol Black B (a trade name of a reactive dyestuff manufactured by Farbwerke Hoechst A.G.) and 0.1% by weight of succinol, squeezed with a pick-up of 80% o.w.f. and dried. The resulting fabric was then soaked in sodium silicate solution, squeezed and subjected to a curing treatment, further followed by successive washings with hot water and with water to provide a black dyed cotton fabric.

Further, a plain silk fabric composed of No. 140 count two-plied warp and weft yarns was soaked in a dye-bath containing 5% by weight of Kayanol Milling Black TLB (a trade name of an acid dyestuff manufactured by Nippon Kayaku Co., Ltd.) and dyed at 98° C. After the dyeing, washings with hot water at 60° C. and with water were carried out to obtain a black dyed silk fabric.

Additionally, a twilled fabric composed of No. 52 count worsted warp and weft yarns was soaked in a dye-bath containing 7% by weight of Mitsui Nylon Black SGL (a trade name of an acid dyestuff manufactured by Mitsui Toatsu Dyes, Ltd.) and dyd at 98° C. After the dyeing, washings with hot water at 60° C. and with water to obtain a black dyed woollen fabric.

Then, three kinds of aqueous dispersion liquids of resin mixtures composed of two resins (mixing ratio of 50:50 by weight) as shown in Table 2 below, were prepared and applied onto the above black dyed fabrics and also the black dyed fabric used in the foregoing Example 1, in an amount of 3% o.w.f.

For each sample of the resulting fabrics, L-value determined is shown in Table 2. Fastnesses to crocking, washing, etc. of the resin treated fabrics were good.

TABLE 2

| Fabric | Resin A Epoxy modified silicone resin $n_A=1.40$ Resin B Fluoro-acrylic ester resin $n_B=1.45$ | Ethylene vinyl-acetate copolymer $n_B=1.47$ | Polyether-ester resin $n_B=1.48$ | No resinous film coating |
|---|---|---|---|---|
| Polyester fabric | 10.4 | 10.5 | 9.2 | 11.9 |
| Cotton fabric | 14.4 | 14.3 | 14.2 | 15.7 |
| Silk fabric | 14.0 | 14.3 | 15.0 | 17.0 |
| Woollen fabric | 11.0 | 11.3 | 11.0 | 12.5 |

EXAMPLE 3

A georgette fabric composed of a 60 d/48 f polyester filament warp yarn having an S-twist of 250 T/M and two kinds of 75 d/72 f polyester filament weft yarns having S- and Z-twists of 3000 T/M, respectively, was crimpled in a washer according to a conventional process and then heat-set in dry at 180° C. The fabric was further scoured with 20% caustic soda aqueous solution at 90° C. to reduce the weight of the fabric by 20%.

The resulting fabric was dyed with 15% o.w.f. of Kayalon Polyester Black GSF and then subjected to a reduction washing to provide a black dyed georgette crepe fabric.

Then, an aqueous dispersion liquid of amino modified polydimethyl siloxane resin (molecular weight: 10,000, amino equivalent: 3,400) and an aqueous dispersion liquid of polyvinyl alcohol (molecular weight: 500, saponification degree: 88%) were mixed together, with mixing ratios shown in Table 3, and applied onto the fabrics in an amount as resin of 3% o.w.f. The fabrics were dried and heat treated to form a film coating of resin mixture thereon, then soaked in hot water at 50–60° C. for 30 minutes, stirred and subsequently dehydrated, followed by drying. The result is shown in Table 3. In Table 3, evaluation of phase-separated conditions are shown by the sign ⊚ that means a clear phase-separation was formed by respective domains of resins A′ and B′, the sign ◉ that means the phase-separation was formed in most part but mutual compatibility was shown in a very small part, the sign Δ that means interfaces of phase-separated resins A′ and B′ were so small that elution was hardly effected and by the sign x that means the phase-separation was not formed and elution treatment could not form dry pits and/or recesses and projections.

TABLE 3

| Resin A′ | Resin B′ | Resin mixture A′/B′ (Weight ratio) | Phase-separated condition | Color-deepening property After resin-application ($L_1$) | After elution ($L_2$) | Color-deepening effect ΔL | Remarks |
|---|---|---|---|---|---|---|---|
| Amino modified silicone | Polyvinyl alcohol | 100/0 | X | 12.4 | 12.4 | 0 | Comparative |
| Amino modified silicone | Polyvinyl alcohol | 90/10 | O | 12.3 | 11.8 | 0.5 | Present invention |
| Amino modified silicone | Polyvinyl alcohol | 70/30 | ⊚ | 12.1 | 11.1 | 1.0 | Present invention |
| Amino modified silicone | Polyvinyl alcohol | 50/50 | ⊚ | 12.3 | 10.7 | 1.6 | Present invention |
| Amino modified silicone | Polyvinyl alcohol | 30/70 | ⊚ | 12.7 | 11.5 | 1.2 | Present invention |

TABLE 3-continued

| Resin mixture | | | | Color-deepening property | | | |
|---|---|---|---|---|---|---|---|
| | | A'/B' (Weight ratio) | Phase-separated condition | After resin-application (L₁) | After elution (L₂) | Color-deepening effect ΔL | Remarks |
| Resin A' | Resin B' | | | | | | |
| Amino modified silicone | Polyvinyl alcohol | 10/90 | Δ | 13.0 | 12.4 | 0.6 | Present invention |
| Amino modified silicone | Polyvinyl alcohol | 0/100 | X | 13.0 | 13.0 | 0 | Comparative |

EXAMPLE 4

As a resin A', a mixture of an epoxy modified silicone (molecular weight of 20,000 and epoxy equivalent, $n_A = 1.40$) with γ-glycidoxypropyl trimethoxy silane in a mixing ratio of 80/20 by weight and, as a resin B', hydroxymethylpropyl cellulose were employed. An aqueous dispersion liquid of a resin mixture of the resin A' with resin B' in a mixing ratio of 70/30 by weight was applied onto the black dyed and washed georgette crepe fabrics prepared in the above Example 3, to form film coating in amounts of resin shown in Table 4. The fabrics were further subjected to an elution treatment with hot water at 80° C. The L-value of the fabric before the application of the resin was 12.5.

The result is shown in Table 4. In Table 4, evaluation of resin adhering conditions are shown by the sign ⊚ that means a uniform film coating was formed on the fiber surfaces, the sign ○ that means unevenness was partly observed and the sign Δ that means unevenness and bridging between fibers with the film coating were observed.

TABLE 4

| Amount of resinous film coating (% o.w.f.) | Resin adhering conditions | Color-deepening property | | | Remarks |
|---|---|---|---|---|---|
| | | After resin application (L₁) | After elution (L₂) | Color-deepening effect ΔL | |
| 0.1 | ⊚ | 12.5 | 12.3 | 0.2 | |
| 0.3 | ⊚ | 12.5 | 12.0 | 0.5 | |
| 0.5 | ⊚ | 12.5 | 11.7 | 0.8 | |
| 1 | ⊚ | 12.2 | 11.2 | 1.0 | |
| 3 | ⊚ | 12.1 | 10.5 | 1.6 | |
| 5 | ⊚~○ | 12.1 | 10.1 | 2.0 | |
| 10 | ○ | 12.0 | 10.6 | 1.4 | |
| 15 | Δ | 12.3 | 11.3 | 1.0 | Hand stiffened a little |

EXAMPLE 5

Aqueous dispersion liquids of resin mixtures of resins A" and B" were prepared with a resin mixing ratio of 50:50 by weight with the combinations shown in Table 5. The black dyed and washed georgette crepe fabrics prepared in Example 3 were soaked in the above liquids according to a conventional process, to adhere on the fabrics 1% o.w.f. of the resin mixture and after drying, heat-treated at 150° C. to fix the resin mixture. Formation on fiber surfaces of good film coatings of resin mixture was clearly observed by a SEM.

Then, the fabrics were subjected to a low temperature plasma etching treatment under the following conditions.

A fabric sample was placed on a grounded electrode and a bell-jar type plasma treatment apparatus as shown in FIG. 8 was vacuumized to a pressure of $10^{-2}$ torr and then controlled at 0.3 torr by introducing O₂ gas thereinto. The etching treatment was conducted for 10 minutes by applying a high frequency of 13.56 MHz with an output of 50 W.

The result is shown in Table 6. In Table 6, Sample No. 0-1 is a control fabric not finished with the resin mixture nor plasma-treated and Sample No. 0-2 is the plasma-treated fabric of Sample No. 0-1, without forming a film coating of resin mixture.

In evaluation of the resin mixture in Table 6, the film formability was determined by uniformity and tenacity of film coatings. It was good in all samples provided with the film coating. With respect to the transparency of the film coating, the sign ⊚ means a high transparency and the sign ○ means a slight opaqueness. In the evaluation of etched pits on the plasma-treated fabric, the small recesses and projections mean existence of a big number of uniform recesses and projections having a small width of about 0.1 μm. The large recesses and projections mean existence of a relatively small number, e.g., less than 10 per 1 μm², of large recesses having a width of about 0.1~several μm, on a smooth surface.

TABLE 5

| Sample No. | Combination of resins in mixture | | | |
|---|---|---|---|---|
| | A" ($n_A$) | | B" ($n_B$) | |
| 1 | ethylene/vinyl acetate copolymer resin | (1.47) | Polyether-ester resin | (1.48) |
| 2 | Fluoroacrylic resin | (1.45) | Polyether-ester resin | (1.48) |
| 3 | Polyurethane | (1.50) | Epoxy modified acrylic resin | (1.46) |
| 4 | Amino modified dimethyl silicone resin | (1.40) | Polyether-ester resin | (1.48) |
| 5 | Polydimethyl silicone resin | (1.43) | Polyether-ester resin | (1.48) |
| 6 | Epoxy modified dimethyl silicone resin | (1.43) | Polyether-ester resin | (1.48) |
| 7 | Epoxy modified dimethyl silicone resin | (1.43) | Polyacrylate resin | (1.48) |
| 8 | Amino-modified silicone resin | (1.40) | Polyacrylate resin | (1.48) |

TABLE 6

| Sample No. | Resin mixture Mutual incompatibility | Etching rate difference | Film-transparency | Etched pits Plasma-treated fabric | L-value | Remarks |
|---|---|---|---|---|---|---|
| 0-1 | — | — | — | — | 12.6 | Control |
| 0-2 | — | — | — | Small recesses and projections | 11.4 | Comparative |
| 1 | No | appreciable (1.30) | ⊚ | Small recesses and projections | 11.6 | Comparative |
| 2 | No | negligible (1.02) | ⊚ | Small recesses and projections | 11.7 | Comparative |
| 3 | Yes | negligible (1.03) | ⊚ | Small recesses and projections | 11.3 | Comparative |
| 4 | Yes | appreciable (1.68) | ⊚ | Large pits | 7.2 | Present invention |
| 5 | Yes | appreciable (3.32) | ⊚ | Large pits | 7.1 | Present invention |
| 6 | Yes | appreciable (1.84) | ⊚ | Large pits | 7.4 | Present invention |
| 7 | Yes | appreciable (1.90) | ⊚ | Large pits | 6.8 | Present invention |
| 8 | Yes | appreciable (1.57) | ⊚ | Large pits | 6.7 | Present invention |

Note: The etching rate difference means a ratio of etching rate of the resin B'' to resin A''.

SEM photomicrographs (×10,000) of fiber surfaces of the plasma-treated Sample No. 8 fabric are shown in FIGS. 5A and 5B. From these Figures, it is understood that relatively large pits were formed on the surface of the resinous film coating.

Further, SEM photomicrographs of fiber surfaces of the plasma-treated Sample No. 0-2 fabric which has no resinous film and Sample No. 2 fabric which has the film coating of the mutually compatible resin mixture are shown in FIGS. 5C and 5D, respectively. As is seen from these FIGS. 5C and 5D, a great number of fine recesses and projections are regularly formed, and those recesses and projections are gently sloping with narrow depths.

EXAMPLE 6

Aqueous dispersion liquid of a resin mixture of an amino modified polydimethyl silicone resin A'' ($n_A = 1.40$) and a polyether-ester resin B'' ($n_B = 1.48$) shown in the formulae below was prepared with a resin mixing ratio, A''/B'', of 70/30 by weight. The liquid was applied onto the black dyed and washed georgette crepe fabric prepared in the foregoing Example 3 to form a film coating of 1.5% o.w.f. on the fiber surfaces. Then, etching treatments with a low-temperature plasma were conducted in the same manner as Example 5, except that the plasma treating time was changed.

The result of analyses of the etched pits from a SEM photomicrograph (×10,000) of the treated fabric is shown in Table 7. The etched pits were substantially recesses.

Resin A'':

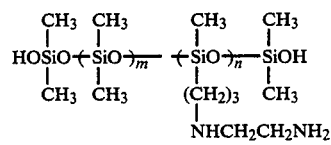

where, m/n = 44/1 and Mw = 10,000.

Resin B'':

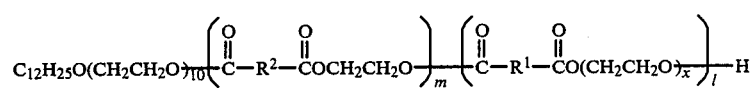

where, $R^1$ and $R^2$ denote adipic acid residue/terephthalic acid residue/5-sulfo isophthalic acid residue of 78/20/2, m/l is 85/5 and molecular weight is 16,000 (a number average molecular weight converted to polystyrene).

TABLE 7

| Sample No. | Plasma treating time (min.) | Etched amount ΔW (wt. %) | L-value | Etched pits Occupation percentage of pits (%) | Number of pits (per μm²) | Remarks |
|---|---|---|---|---|---|---|
| 9 | 0 | — | 10.7 | — | — | Comparative |
| 10 | 1 | 0.1 | 9.5 | 6.1 | 3.1 | Present invention |
| 11 | 2 | 0.2 | 8.8 | 11.4 | 4.5 | Present invention |
| 12 | 5 | 0.4 | 8.0 | 18.3 | 5.2 | Present invention |
| 13 | 10 | 0.6 | 7.1 | 26.4 | 8.7 | Present invention |
| 14 | 20 | 1.2 | 5.6 | 28.9 | 4.0 | Present invention |

EXAMPLE 7

Using the amino modified polydimethyl silicone resin A'' and the polyether-ester resin B'', both used in Example 6, an aqueous dispersion liquid of resin mixture was prepared with a resin mixing ratio, A''/B'', of 20/80 by weight. The liquid was applied onto the black dyed and washed georgette crepe fabric prepared in the foregoing Example 3 to form a film coating of 1.0% o.w.f. on the fiber surfaces. A square sample of the fabric of which each side is 5 cm long, was placed between parallel plate electrodes 3 and 5 which were provided 3 cm apart in a bell-jar type plasma treatment apparatus as shown in FIG. 8. The pressure was controlled at 0.5 torr by introducing nitrogen gas and a low temperature plasma was generated by applying a high frequency of 13.56 MHz with an output of 100 W to treat the fabric sample with the plasma.

A plasma sheath was formed within a distance of 1 cm from the upper antenna electrode 3.

After the plasma treatment for a predetermined period, the etched amount ($\Delta W$) through the treatment was determined and conditions of the color shade (L-value, etc.) were observed. The result is shown in Table 8.

TABLE 8

| Test No. | × (cm) | Time (min.) | $\Delta W$ (%) | L-value | Remarks |
|---|---|---|---|---|---|
| Control 1 | — | 0 | 0 | 12.9 | Untreated |
| Test 1 | 0 | 3 | 0.17 | 9.9 | |
| Test 2 | 0 | 5 | 0.28 | 9.2 | |
| Test 3 | 0 | 10 | 0.48 | 9.4 | |
| Test 4 | 0 | 20 | 0.72 | 9.3 | |
| Test 5 | 1 | 3 | 0.15 | 10.6 | |
| Test 6 | 1 | 5 | 0.25 | 10.0 | |
| Test 7 | 1 | 10 | 0.48 | 9.6 | |
| Test 8 | 1 | 20 | 0.75 | 10.1 | |
| Comparative | | | | | |
| test 1 | 3 | 3 | 0.10 | 12.8 | |
| test 2 | 3 | 5 | 0.13 | 11.5 | |
| test 3 | 3 | 10 | 0.19 | 9.3 | Color faded |
| test 4 | 3 | 20 | 0.31 | 9.9 | Color faded |

Note:
The × is distance between the sample and the antenna electrode.

EXAMPLE 8

The aqueous dispersion liquid of resin mixture used in Example 7 was applied onto the black dyed woollen fabric prepared in Example 2 to form a film coating a 1.0 % o.w.f. on the fiber surfaces. Then, the fabric was subjected to a plasma treatment under the same conditions as those of Example 7. The result is shown in Table 9.

TABLE 9

| Test No. | × (cm) | Time (min.) | L-value | Remarks |
|---|---|---|---|---|
| Control 2 | — | 0 | 15.1 | Untreated |
| Test 9 | 0 | 5 | 8.1 | |
| Test 10 | 0 | 10 | 8.0 | |
| Test 11 | 0 | 20 | 8.3 | |
| Test 12 | 1 | 5 | 8.8 | |
| Test 13 | 1 | 10 | 9.0 | |
| Test 14 | 1 | 20 | 8.9 | |
| Comparative | | | | |
| test 5 | 3 | 5 | 11.4 | |
| test 6 | 3 | 10 | 10.2 | |
| test 7 | 3 | 20 | 8.5 | |

SEM photomicrographs of the fabric of Test no. 9 and a comparative fabric that had no resinous film coating and was plasma-treated under the same conditions as Test no. 9 are shown in FIGS. 6A and 6B, respectively. In FIG. 6A, formation of only relatively large pits having depths broader than the mouth is observed on the smooth resinous film coating. In FIG. 6B, formation of a great number of fine recesses and projections is observed that is characteristic of those formed on wool by plasma treatments.

EXAMPLE 9

A polyester filament yarn of 45 d/12 f (semi-dull, U-shape cross-section) spun and drawn by an ordinary process and a polyester filament yarn of 75 d/36 f (bright, circular cross-section) high-speed spun with a take up speed of 3,200 m/min. were interlaced and false twisted to produce a composite bulky yarn YA of 120 d/48 f. Then, using yarns YA which were twisted in S-and Z-directions with 2,500 T/M, respectively, as the front surface warp yarns; a yarn YA which was twisted in S-direction with 800 T/M, as the back surface warp yarn; and yarn YA which were twisted in S- and Z-directions with 2,500 T/M, respectively, as the weft yarn, fabrics having a warp density of 220 counts/inch and a weft density of 87 counts/inch were woven, which had a soft hand, aventurine georgette-like front surface and satinlike back surface.

According to a conventional process, these fabrics were washed, heat-set at 180° C. in dry and soaked in 20% caustic soda aqueous solution at 90° C. to reduce the weight of the fabric by 20%. The resulting fabrics each having a weight of 180 g/m2 were dyed with 15% o.w.f. of Kayalon Polyester Black GSF and then subjected to a reduction washing to provide black dyed fabrics.

Then, an aqueous dispersion liquid comprising a fluoroacrylic resin ($n_B = 1.45$) and an amino modified polydimethyl silicone resin ($n_A = 1.40$) weight ratio of 20/80 was prepared and applied, by a soaking method, onto the above black dyed fabrics in an add-on amount of 1.5% o.w.f., followed by drying. The dried fabrics were cured through a heat-treatment at 150° C.

Then, the fabrics were subjected to a low temperature plasma etching treatment under the following conditions.

The back surface of the fabric was contacted with an antenna electrode and a plasma treatment apparatus was vacuumized to a pressure of $10^{-2}$ torr and then controlled at 0.3 torr by introducing $O_2$ gas thereinto. A plasma treatment was conducted by applying a high frequency of 13.56 MHz with an output of 50 W to provide a fabric sample A.

The same plasma treatment as the above except that the back surface of the fabric sample was contacted with a grounded electrode, was conducted to provide a fabric sample A'.

These samples, without being washed, were soaked in aqueous dispersions of resins H shown in Table 10 and then dried and heat-treated at 120° C. for 3 minutes.

As is clear from Table 10, the formation of the abrasion resistant resin film coating II can restrain an increase after rubbing of L-value in less than 1.5 and lightening of color in rubbed portions becomes not

TABLE 10

| Test No. | Sample | Abrasion resistant resin (% owf) | | L-value | | |
|---|---|---|---|---|---|---|
| | | | | Lb | La | δL |
| Test 1 | A | — | (0) | 8.7 | 11.1 | 2.4 |
| Test 2 | A | Silanol terminated polydimethyl siloxane $n_B = 1.40$ | (0.1) | 9.0 | 10.5 | 1.5 |
| Test 3 | A | Silanol terminated polydimethyl siloxane $n_B = 1.40$ | (0.3) | 9.0 | 10.2 | 1.2 |
| Test 4 | A | Silanol terminated polydimethyl silo- | (0.5) | 9.2 | 10.0 | 0.8 |

TABLE 10-continued

| Test No. | Sample | Abrasion resistant resin (% owf) | | Lb | La | δL |
|---|---|---|---|---|---|---|
| | | xane $n_B = 1.40$ | | | | |
| Test 5 | A | Silanol terminated polydimethyl siloxane $n_B = 1.40$ | (1.0) | 9.5 | 9.9 | 0.4 |
| Test 6 | A' | — | (0) | 9.5 | 11.3 | 1.8 |
| Test 7 | A' | Silanol terminated polydimethyl siloxane $n_B = 1.40$ | (0.3) | 9.7 | 10.9 | 1.2 |
| Test 8 | A' | Silane terminated polydimethyl siloxane $n_B = 1.40$ | (0.5) | 9.9 | 11.0 | 1.1 |
| Test 9 | A | Amino modified polydimethyl siloxane/ epoxy silane | (0.3/0.03) | 9.0 | 10.1 | 1.1 |
| Test 10 | A | Amino modified polydimethyl siloxane/ epoxy silane | (0.3/0.1) | 9.3 | 10.1 | 0.8 |
| Test 11 | A | Amino modified polydimethyl siloxane/ epoxy silane | (0.5/0.1) | 9.4 | 10.0 | 0.6 |

With respect to the fabric sample of test No. 4, SEM photomicrographs (×10,000) of fiber surface before and after coating of the abrasion resistant film are shown in FIGS. 9 and 10, respectively.

What is claimed is:

1. A deep-colored fiber having on its surface a film coating of a resin mixture comprising at least two kinds of resins that are incompatible with each other and are in phase-separated condition in said film coating, and an abrasion resistant resinous film covering said film coating.

2. A fiber as claimed in claim 1, wherein one of said two kinds of resins has a refractive index $n_A$ of a resin phase and has a lower affinity for the fiber, the other one of said two kinds of resins has a refractive index $n_B$ of a resin phase and has a higher affinity for the fiber, and said refractive indices $n_A$, $n_B$ and the refractive index $n_O$ of the fiber are in a relation satisfying the following inequalities:

$n_A < n_B$ and $n_A < n_O$.

3. A fiber as claimed in claim 2, wherein said resin phase that is lower is affinity for the fiber is a silicone resin.

4. A fiber as claimed in claim 1, wherein said film coating of a resin mixture is formed on the surface of the fiber in an amount between 0.5% and 10% o.w.f.

5. A fiber as claimed in claim 1, wherein said resins mixture comprises two kinds of resin with a mixing ratio between 90/10 and 10/90.

6. A deep-colored fiber having on its surface a film coating of a resin mixture comprising at least two kinds of resins that are incompatible with each other and are in phase-separated condition in said film coating, said two kinds of resins being different in solvent-solubility and wherein, on at least a part of the surface of the film coating, pits and/or recesses and projections are formed by elution of at least one kind of resin that is higher in solvent-solubility.

7. A fiber as claimed in claim 6, wherein said resin that is higher in solvent-solubility is also higher in affinity for the fiber than the other resin.

8. A fiber as claimed in claim 7, wherein said other resin that is lower in solvent-solubility is a silicone resin.

9. A fiber as claimed in claim 6, wherein said resin that is higher in solvent-solubility is water-soluble or alkali-soluble.

10. A fiber as claimed in claim 6, wherein said film coating of a resin mixture is formed on the surface of the fiber on an amount between 0.5% and 15% o.w.f 11. A fiber as claimed in claim 1, wherein said at least two kinds of resins are different in plasma-etching resistance and on at least a part of the surface of the film coating, pits are formed, prior to covering said film coating with said abrasion-resistant resinous film, by plasma etching of at least one kind of resin that is lower in plasma-etching resistance.

12. A fiber as claimed in claim 11, wherein said one kind of resin that is lower in plasma-etching resistance is higher in affinity for the fiber than another resin that is higher in plasma-etching resistance.

13. A fiber as claimed in claim 12, wherein said another resin that is higher in plasma-etching resistance is a silicone resin.

14. A fiber as claimed in claim 11, wherein the resin mixture is a combination of a silicon resin with a polyether-ester resin.

15. A fiber as claimed in claim 11, wherein the resin mixture is a combination of a silicone resin with a fluoroacrylic resin.

16. A fiber as claimed in claim 11, wherein said film coated of a resin mixture is formed on the surface of the fiber in an amount between 0.2% and 15% o.w.f.

17. A fiber as claimed in claim 11, wherein said pits are formed at a density of up to 30 pits per 1 $\mu m^2$.

18. A fiber as claimed in claim 11, wherein said pits occupy up to 50% of the area of the surfaces of the film coating.

19. A fiber as claimed in claim 6, wherein said surface of the film coating having said pits and/or recesses and projections is further covered by with an abrasion resistant resinuous film.

20. A fiber as claimed in claim 1, or claim 11 or claim 19, wherein said abrasion resistant resinous film comprises a silicone resin.

21. A fiber as claimed in claim 11 or claim 19, wherein said abrasion resistant resinous film is thin and uniform enough not to fill up but to preserve the recesses or pits provided on the resinous film coating.

22. A fiber as claimed in claim 1, claim 11 or claim 19, wherein said abrasion resistant resinous film is up to 0.5 $\mu m$ thick.

23. A fiber as claimed in claim 1, claim 11 or claim 19, wherein the refractive index $n_o$ of the fiber is higher than the refractive index $n\alpha$ of the resin lower in solvent solubility or higher in plasma-etching resistance in the resinous film coating and the refractive index $n\beta$ of said abrasion resistant resinous film.

24. A fiber as claimed in claim 1, claim 11 or claim 19, wherein an L-value $L_b$ of the fiber before a rubbing test is less than 10 and a difference δL between $L_b$ and an L-value $L_a$ of the fiber after the rubbing test is 1.5 or less.

25. A deep-colored fiber having its surface coated with a film coating essentially of a mechanical blend of at least two different kinds of synthetic resins A and B, said resins A and B being incompatible with each other and existing as separate phases in said film, both of said resins A and B being substantially transparent, film-forming resins which are dispersible in water and miscible with each other, the amount of said film being from 0.2 to 15 % by weight, based on the weight of the fiber, the weight ratio of (resin A/resin B) in said film being in the range of from (90/10) to (10/90,) said resin A having an index of refraction $n_A$ in the range of from 1.35 to 1.50, said resin B having an index of refraction $n_B$ in the range of 1.40 to 1.60, and wherein $n_B$ is higher than $n_A$, $n_A$ is lower than the index of refraction $n_O$ of the fiber and resin A has a lower affinity for the fiber than resin B.

26. A deep-colored fiber as claimed in claim 25 in which resin A is a silicone resin and resin B is selected from the group consisting of acrylic resin, partially fluorinated acrylic resin, polyethylene glycol-modified acrylic resin, epoxy-modified acrylic resin, melamine resin, fluoro resin, amino resin, polyester resin, polyurethane resin, ethylene-vinyl acetate copolymer resin and polyether-ester resin.

27. A deep-colored fiber as claimed in claim 26 in which the amount of said film is from 1 to 7% by weight, based on the weight of the fiber, and the weight ratio of (resin A/resin B) is from (70/30) to (30/70.)

28. A deep-colored fiber having its surface coated with a pitted resinous coating obtained by treating (1) a film coating consisting essentially of a mechanical blend of at least one synthetic resin A and a material B, which material B is selected from the group consisting of water-soluble macromolecular materials and organic solvent-soluble synthetic resins, with (2) a solvent effective to dissolve material B to form pits in said film coating, said resin A and material B being incompatible with each other and existing as separate phases in said film coating, said resin A being a substantially transparent, film-forming resin, the ratio of the solvent solubilities of resin A/resin B being from (½) to (1/10,)said resin A being lower in refractive index than material B, the amount of said film coating being from 0.2 to 10 % by weight, based on the weight of said fiber, the weight ratio of (resin A/material B) in said film coating being in the range of from (80/20) to (50/50,) the ratio of the sum of the areas of the pits in said pitted coating to the surface area of said pitted coating being from (5/100) to (50/100,) the number of pits per unit area of said pitted coating being from 1 to 30 pits/$\mu m^2$, said pits having acute angled edges and being undercut when viewed in cross-section.

29. The deep-colored fiber of claim 28 in which said pitted resinous coating is coated with a transparent second resinous coating film consisting essentially of an abrasion-resistant synthetic resin, said seconds resinous coating film having an index of refraction lower than the index of refraction of the fiber, said second resinous coating film having a thickness of from 0.05 to 0.5 $\mu$m and being applied so as to not fill up said pits.

30. A deep-colored fiber having its surface coated with a pitted resinous film coating obtained by treating (1) a film layer consisting essentially of a mechanical blend of at least two different kinds of synthetic resins A and B, with (2) plasma etching effective to form pits in said film layer, said resins A and B being incompatible with each other and existing as separate phases in said film layer, the ratio of the etching ratio of (resin B/resin A) being at least 1.5, said resin A being a transparent, film-forming resin and having a lower index of refraction than resin B, the amount of said film layer being from 0.2 to 10% by weight, based on the weight of said fiber, the weight ratio of (resin A/resin B) being in the range of from (90/10) to (30/70,) said pits having acute angled edges and being undercut when viewed in cross-section.

31. A deep-colored fiber of claim 30 in which said pitted resinous coating is coated with a transparent second resinous coating film consisting essentially of an abrasion-resistant synthetic resin, said second resinous coating film having an index of refraction lower than the index refraction of the fiber, said second resinous coating film having a thickness of from 0.05 to 0.5 $\mu$m and being applied so as not to fill up said pits.

* * * * *